US008826542B2

(12) United States Patent
Langer et al.

(10) Patent No.: US 8,826,542 B2
(45) Date of Patent: Sep. 9, 2014

(54) METHOD FOR FORMING AN END-SIDE TOOTHING ARRANGEMENT

(71) Applicant: Schaeffler Technologies AG & Co. KG, Herzogenaurach (DE)

(72) Inventors: Roland Langer, Schwanfeld (DE); Peter Niebling, Bad Kissingen (DE); Sebastian Lorenz, Rothenkirchen (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 0 days.

(21) Appl. No.: 13/962,189

(22) Filed: Aug. 8, 2013

(65) Prior Publication Data
US 2013/0318796 A1 Dec. 5, 2013

Related U.S. Application Data

(62) Division of application No. 12/789,118, filed on May 27, 2010.

(30) Foreign Application Priority Data

May 28, 2009 (DE) .......................... 10 2009 023 042

(51) Int. Cl.
B21D 53/10 (2006.01)
F16D 1/076 (2006.01)
(Continued)

(52) U.S. Cl.
CPC .............. F16C 43/04 (2013.01); F16D 1/076 (2013.01); F16C 2326/02 (2013.01); B21K 1/30 (2013.01); F16C 33/605 (2013.01); F16C 19/186 (2013.01)
USPC ................ 29/898.06; 29/898.07; 29/898.061; 29/898.09; 29/894.361; 384/544; 384/589; 384/537; 384/584; 464/178; 464/179; 301/124.1; 301/126; 301/131; 180/258; 180/259

(58) Field of Classification Search
CPC ............ B21D 53/10; B21K 1/76; B21K 1/40; B23P 17/00; B23P 19/04; B60B 35/00; B60B 37/00; B60B 27/00; B60B 27/0084; B60K 17/30; F16C 13/00; F16C 35/00; F16C 43/00; F16C 43/04; F16C 13/02; F16C 19/02; F16C 19/28; C16C 19/00
USPC ........... 29/898.07, 898.06, 898.061, 898.062, 29/898.09, 724, 894.361, 725, 446, 525; 384/544, 589, 537, 584; 464/178, 179; 301/124.1, 126, 131; 180/258, 259
See application file for complete search history.

(56) References Cited

U.S. PATENT DOCUMENTS 5,240,333 A 8/1993 Hassiotis
6,036,370 A 3/2000 Kessen
(Continued)

FOREIGN PATENT DOCUMENTS

DE 3604630 A1 8/1987
DE 3636243 A1 5/1988
(Continued)

Primary Examiner — David Bryant
Assistant Examiner — Jun Yoo
(74) Attorney, Agent, or Firm — Simpson & Simpson, PLLC

(57) ABSTRACT

In summary, the invention relates to a method for forming an end-side toothing arrangement of a roiling bearing, in particular a wheel bearing. The aim is to improve the uniformity of the end-side toothing arrangement and to allow a greater tooth depth. This is achieved by two method steps in that, in a first step before the reshaping of an end piece of a hub, a die is axially arranged on the rolling bearing in a preassembled state and, in a second step during the reshaping of the end piece and the shaping of the end-side toothing arrangement, the die radially delimits a radial recess of the rolling rivet collar as it forms. In addition, the die reduces or prevents radial widening of the inner ring.

7 Claims, 2 Drawing Sheets

(51) Int. Cl.
  *F16C 43/04* (2006.01)
  *B21K 1/30* (2006.01)
  *F16C 33/60* (2006.01)
  *F16C 19/18* (2006.01)

(56) References Cited

U.S. PATENT DOCUMENTS

| | | |
|---|---|---|
| 6,422,758 B1 * | 7/2002 | Miyazaki et al. ............. 384/544 |
| 6,532,666 B1 * | 3/2003 | Denny, Jr. et al. ......... 29/898.06 |
| 7,806,597 B2 | 10/2010 | Langer |
| 7,832,940 B2 | 11/2010 | Matsui |
| 2001/0046339 A1 | 11/2001 | Miyazaki |
| 2007/0217728 A1 * | 9/2007 | Kashiwagi et al. ........... 384/544 |
| 2008/0148893 A1 | 6/2008 | Langer |
| 2010/0272380 A1 | 10/2010 | Zink |

FOREIGN PATENT DOCUMENTS

| | | |
|---|---|---|
| DE | 102005018127 A1 | 10/2006 |
| DE | 102008004924 A1 | 7/2009 |
| EP | 2042755 A2 | 4/2009 |
| JP | 2004345370 | 12/2004 |
| JP | 2009543009 | 12/2009 |
| WO | 2006105748 A1 | 10/2006 |
| WO | 2009139137 | 11/2009 |

* cited by examiner

METHOD FOR FORMING AN END-SIDE TOOTHING ARRANGEMENT

CROSS REFERENCE TO RELATED APPLICATIONS

This application is a divisional application of U.S. patent application Ser. No. 12/789,118, filed May 27, 2010, which claims priority of DE 10 2009 023 042.4, filed May 28, 2009. Both applications are incorporated herein by reference.

FIELD OF THE INVENTION

The invention relates to a method for forming an end-side toothing arrangement from a rolling rivet collar of a rolling bearing, in particular a wheel bearing. The invention further relates to a rolling bearing, or wheel bearing, with a correspondingly molded-on end-side toothing arrangement.

BACKGROUND OF THE INVENTION

A method of this type is used in particular in the automotive field in the manufacture of wheel bearings.

In the past, it has been found that a wheel bearing, but also other rolling bearings with a rolling rivet collar, can advantageously be connected to the driving element of the drive train via an end-side toothing arrangement in order to save installation space or to avoid problems of fitting a radial toothing arrangement.

A method for reshaping an end piece of a wheel hub is known from US 20010046339 A1, the end piece being reshaped into a rolling rivet collar. While the rolling rivet collar is shaped by what is known as a rivet header, unnecessary widening of the inner ring is prevented in that the inner ring is radially supported from the outside inwards by a support.

The end piece of a wheel hub may be axially and radially deformed by means of the rivet heading method. This involves the formation of teeth which are oriented in the axial direction and form a toothing arrangement circle around the axis of rotation. A method of this type and also a corresponding wheel bearing with a rolling rivet collar having teeth on the end side emerge from WO 2006105748 A1.

The tooth depth of the end-side toothing arrangement is a crucial variable in the axial transmission of high torques. The greater the tooth depth is, the greater the maximum torque to be transmitted is. However, the limits of the rivet heading method become apparent when a large number of thin teeth having a large tooth depth have to be produced. On account of the wobbling motion of the rivet header, although a tooth well can be actively shaped, the tip of the tooth can be shaped only with difficulty, as the direction of material flow is opposed to the action of force and the rolling rivet collar to be shaped opposes enlargement of its surface area.

Furthermore, it has in practice been found that the rivet heading method often leads to an unevenly shaped end-side toothing arrangement in which the engagement with the mating toothing arrangement does not always have a sufficiently precise fit for uniform torque transmission.

SUMMARY OF THE INVENTION

The invention is based on the object of specifying a method for forming an end-side toothing arrangement and a rolling bearing with an end-side toothing arrangement, in which the aforementioned drawbacks are avoided.

The method according to the invention for forming an end-side toothing arrangement from a rolling rivet collar of a roiling bearing, in particular a wheel bearing, includes at least the following steps:

a) In a first step, before the final reshaping of an end piece of the hub of the rolling bearing, for example after a shaping pretreatment of the end piece (what is known as flaring), or on the end piece, which has not been pretreated, a die is axially arranged on the rolling bearing in a preassembled state. The end piece may for example be the hollow cylindrical end of a wheel hub which the rivet header is intended to deform both axially and radially. The hub of the rolling bearing is the rotating part of the rolling bearing onto which the wheel flange is molded in the case of the wheel bearing.

The term "preassembled state" means in this connection that the hub, the inner ring or rings, the outer ring or rings and also the rolling bodies are already arranged relative to one another in an operational manner and are ultimately to be united by cold reshaping of the rolling rivet collar to form a rolling bearing unit.

b) In a second step during the reshaping of the end piece of the hub and the simultaneous shaping of the end-side toothing arrangement, the die delimits a radial expansion of the rolling rivet collar as it forms. In this case, the rolling bearing unit is pretensioned for axially securing the inner ring by the rolling rivet collar as it forms.

The die is an instrument which is used in a template-like manner in the sense of a delimitation in order to restrict radial expansion during the cold reshaping. As a result, the material flow of the rolling rivet collar is diverted in an intensified manner in the axial direction during the cold reshaping. The shaping by the rivet header, the force exerted by which is opposed to the flow of material, is thus much more effective. The teeth of the end-side toothing arrangement can be shaped more precisely. Even shapes which cannot be achieved without a die, for example a greater axial tooth height, are possible.

Advantageously, the die shapes an axial and/or radial outer face of the rolling rivet collar. In addition to the function of the radial delimitation by the die, the die can also be used for shaping the rolling rivet collar. This may for example be the case on the cylindrical outer face, or else in an axial outer face of the rolling rivet collar. It is thus possible to achieve very extensive design freedom and to use this freedom advantageously for a desired shape of the rolling rivet collar. The die and the rivet header can interact in such a way that the desired material flow occurs. The result becomes all the more dimensionally precise when the die and the rivet header can be used to control any possible spread of the loss of material and the deformation pressure acting on the rolling rivet collar as it forms is increased.

Advantageously, an inner extension of the die shapes and delimits the radial outer face of the rolling rivet collar. If the inner extension is used as a delimiting element, it is beneficial to provide various inner extensions for various predefined shapes of the rolling rivet collar, wherein the inner extensions can be inserted into the die.

Advantageously, a clamping ring radially supports the inner ring of the rolling bearing from the outside inwards during the reshaping (second step). A clamping ring of this type prevents the disadvantageous widening of the inner ring in the radial direction during the rivet heading.

Advantageously, the clamping ring is fastened to the die or is integrally connected thereto. A one-piece embodiment also allows the radial supporting of the inner ring to be at the same time ensured in one operation, that is to say when arranging the die on the preassembled rolling bearing.

The rolling bearing according to the invention, in particular a wheel bearing, with a rolling rivet collar with a molded-on end-side toothing arrangement, wherein the rolling rivet collar has been radially delimited and/or shaped on a radial outer face during the formation of the rolling rivet collar, displays a uniform toothing arrangement formation and can be used, owing to an optimized toothing arrangement depth, for transmission of a high torque.

Advantageously, the outer face of the rolling rivet collar is shaped annularly, conically or in a similar manner during the rolling riveting process. The rolling rivet collar can then be shaped in an advantageous manner for the rolling bearing: for example, in such a way that the rolling rivet collar supports the sealing function of a sealing arrangement or forms a sealing gap with another component, for example a joint bell.

Advantageously, the outer face of the rolling rivet collar has a circumferentially continuing, in particular repeating, embossment. This allows the rolling rivet collar to be used, for example, to attach information, for example for manufacturer information, serial numbers, specifications, or product labeling.

Advantageously, the circumferentially continuing embossment is embodied as an encoder. This fulfills a component integration which is very efficient in terms of manufacture and leads to a stable transmitter wheel. Normally, encoders have to be used as a separate component requiring a separate manufacturing step. This step is now no longer necessary. In addition, the encoder cannot move axially away from the sensor of a rotational speed measuring device. This ensures a very reliable measurement of rotational speed.

Advantageously, the outer face of the rolling rivet collar is provided at least in part as a seat for an encoder or a sealing element. The outer face may be configured in such a way that it is optimal for the component in question. This may for example be ensured in a force-transmitting manner by a substantially smooth outer face or else in a form-fitting manner by an outer face with elements engaging with the component in question.

Further advantageous formations and preferred developments of the invention may be inferred from the description of the figures and/or the sub-claims.

DETAILED DESCRIPTION OF THE PREFERRED EMBODIMENTS

Figure 1:
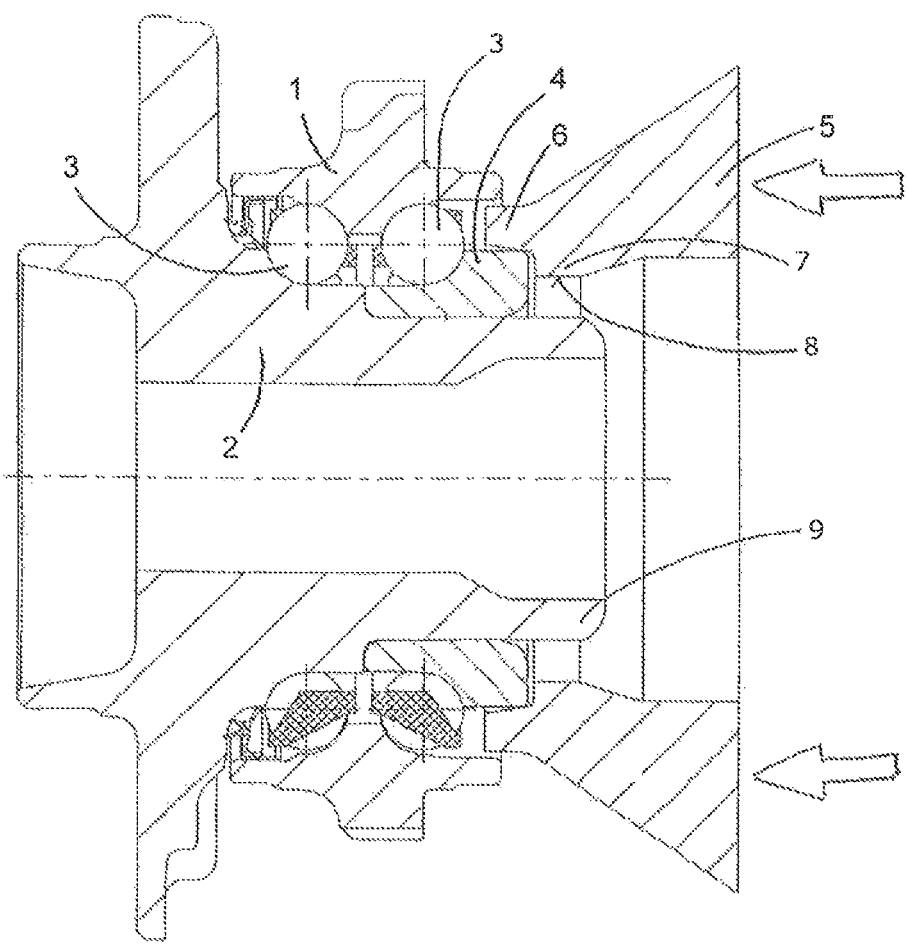
FIG. 1 is a longitudinal section of a preassembled wheel bearing unit with the die before the rolling riveting process.

FIG. 1 is a longitudinal section of a third-generation preassembled wheel bearing unit with a die 5 before the rolling riveting process in a first step of the method for forming an end-side toothing arrangement.

The deformable, cylindrical end piece 9 of the wheel hub 2 is to be cold reshaped in the pending rolling riveting process. For this purpose, the die 5 is arranged on the preassembled wheel bearing unit in such a way that a molding face 8 of the inner extension 7 can be used for radially delimiting and shaping the rolling rivet collar. The molding face 8 is cylindrical, allowing a likewise cylindrical shape to be imparted to the roiling rivet collar. However, the molding face 8 could also be configured conically for the purpose of better shaping.

The inner extension 7 is designed in one piece with the die 5, so that the method can be kept easy to carry out.

Advantageously, the damping ring 6 is also formed in one piece with the die 5 and conically embodied on the radially inner side. The conicity establishes the radial supporting of the inner ring 4 in such a way that an increased axial pretensioning force (in the direction indicated by the arrow) also allows the radial supporting force to be regulated.

Advantageously, the outer ring 1 and the rolling bodies of the rows 3 of rolling bodies are not included in the transmission of force, so that these parts cannot become damaged during the rolling riveting process.

Alternatively, the molding face 8 can display all possible desired shapes which can be impressed on the rolling rivet collar. In addition, the radial run-out of the end-side toothing arrangement is improved on account of the centering of the die 5 by means of the inner ring 4.

Figure 2:
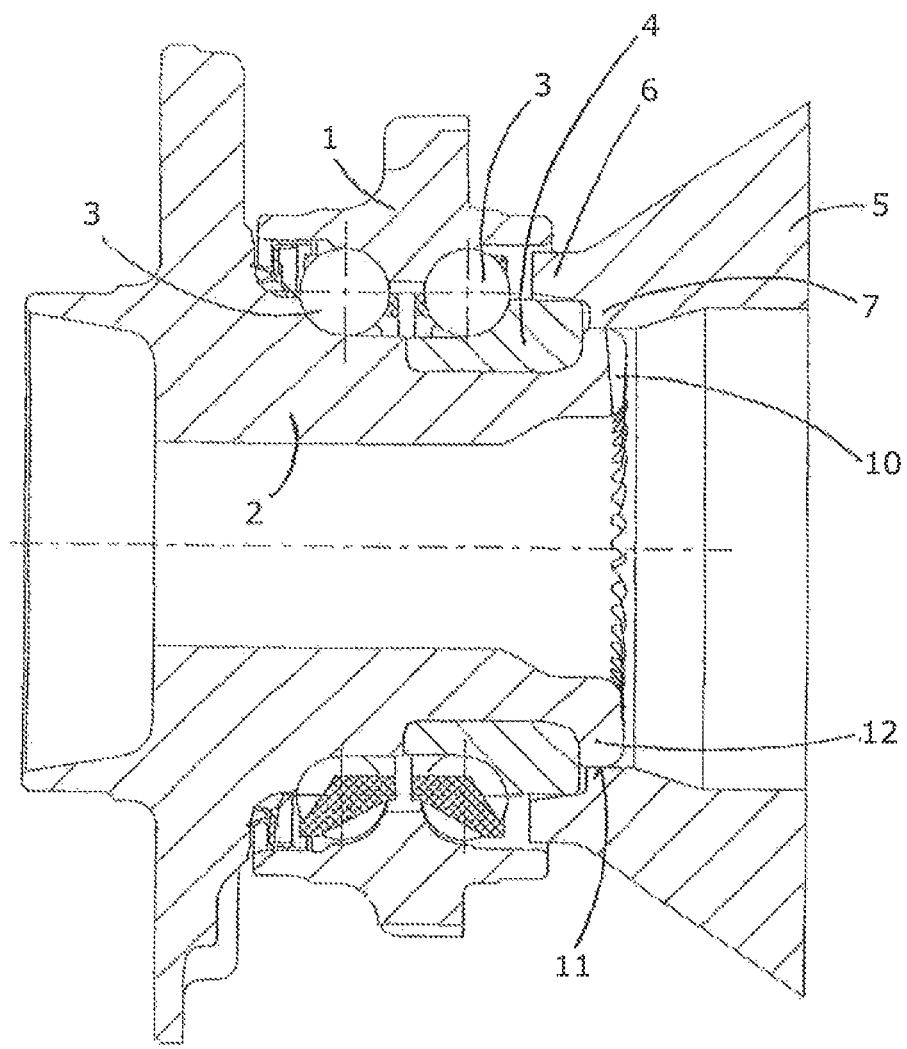
FIG. 2 is a longitudinal section of a preassembled wheel bearing unit with the die after the rolling riveting process.

FIG. 2 is a longitudinal section of a preassembled wheel bearing unit with the die 5 after the rolling riveting process.

After the cold reshaping, the formation of the end-side toothing arrangement 10 is completed. The radial outer face 11 of the rolling rivet collar 12 has assumed the cylindrical shape of the molding face 8 (denoted in FIG. 1).

The die 5 can now be removed in the axial direction, as the rolling rivet collar 12 maintains the pretensioning of the rolling bodies via the bearing rings 1, 4 and the wheel hub 2.

In summary, the invention relates to a method for forming an end-side toothing arrangement of a rolling bearing, in particular a wheel bearing. The aim is to improve the uniformity of the end-side toothing arrangement and to allow a greater tooth depth. This is achieved by two method steps in that, in a first step before the reshaping of an end piece of a hub, a die is axially arranged on the rolling bearing in a preassembled state and, in a second step during the reshaping of the end piece and the shaping of the end-side toothing arrangement, the die radially delimits a radial expansion of the rolling rivet collar as it forms. In addition, the die reduces or prevents radial widening of the inner ring.

LIST OF REFERENCE NUMERALS

1 Outer ring
2 Wheel hub
3 Rows of rolling bodies
4 Inner ring
5 Die
6 Clamping ring
7 Inner extension
8 Molding face
9 Deformable, cylindrical end piece
10 End-side toothing arrangement
11 Outer face of the rolling rivet collar
12 Rolling rivet collar

The invention claimed is:

1. A method for forming an end-side toothing arrangement from a rolling rivet collar of a rolling bearing, the method comprising:
    before the reshaping of an end piece of a hub, axially inserting a die on the rolling bearing in a preassembled state such that an entirety of the die is beyond, in a direction orthogonal to an axis for the rolling bearing, a radially innermost edge of an inner ring for the rolling bearing; and
    reshaping the end piece to form a rolling rivet collar, wherein during the reshaping of the end piece and simultaneous shaping of the end-side toothing arrangement, the rolling rivet collar contacts the die and the die radially delimits a radial expansion of the rolling rivet collar.

2. The method according to claim 1, further comprising:
shaping, with the die, at least one of an axial outer face and a radial outer face of the rolling rivet collar during tile reshaping.

3. The method according to claim 2, further comprising:
shaping and delimiting, with an inner extension of the die, the radial outer face of the rolling rivet collar during the reshaping.

4. The method according to claim 1, wherein the tile die includes a clamping ring, the method further comprising:
radially supporting, with the clamping ring and from the outside inwards, the inner ring of the rolling bearing during the step of reshaping.

5. The method according to claim 4, wherein the clamping ring is fastened to the die or is integrally connected thereto.

6. A method for forming an end-side toothing arrangement from a rolling rivet collar of a rolling bearing, the method comprising:
positioning an inner ring on a cylindrical portion of an outer circumferential surface of a hub;
disposing a plurality of rows of rolling bodies between the inner ring and an outer ring;
contacting an outer circumferential surface of the inner ring with a first inner circumferential surface of a die;
positioning an entirety of the die radially outward of a radially innermost edge of the inner ring;
applying a force to a portion of the hub extending furthest in a second axial direction opposite a first axial direction;
displacing, via the force, material forming the portion of the hub; and,
contacting a second inner circumferential surface of the die with the displaced material to form a radially outermost surface of the rolling rivet collar.

7. A method for forming an end-side toothing arrangement from a rolling rivet collar of a rolling bearing, the method comprising:
positioning an inner ring on a cylindrical portion of an outer circumferential surface of a hub including first and second axial ends extending furthest in first and second opposite axial directions, respectively, the first and second directions parallel to an axis for the rolling bearing;
disposing a plurality of rows of rolling bodies between the inner ring and an outer ring;
positioning an entirety of a die radially outward of a radially innermost edge of the inner ring;
contacting an outer circumferential surface of the inner ring with a first inner circumferential surface of the die;
applying a force to the first end of the hub;
displacing, via the force, material forming the first axial end of the hub;
contacting a cylindrical inner circumferential surface of the die with the displaced material to form a cylindrical outer circumferential surface of the rolling rivet collar; and,
forming, via the force, at least one tooth in the first axial end of the hub, the at least one tooth including an edge substantially orthogonal to the axis.

* * * * *